Figure 4:
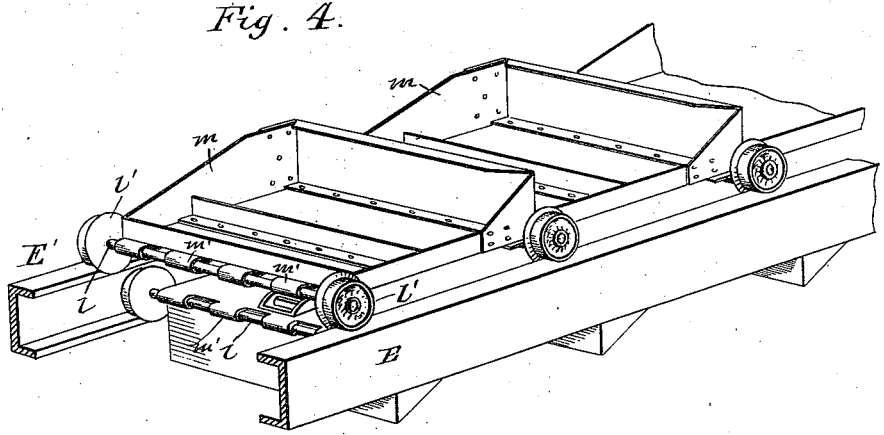

(No Model.) 6 Sheets—Sheet 1.
A. J. MASON.
CONVEYER FOR MAKING ARTIFICIAL EXCAVATIONS FOR WATER COURSES.
No. 592,657. Patented Oct. 26, 1897.
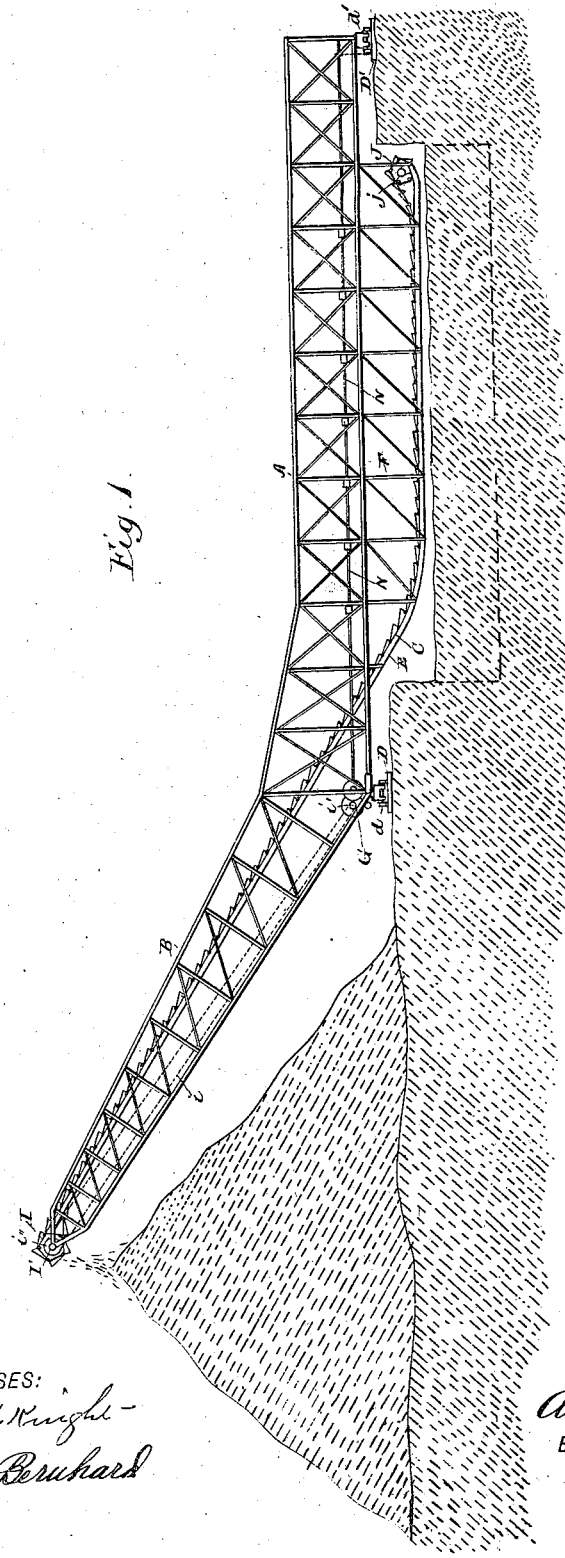
WITNESSES:
INVENTOR
Arthur J. Mason
BY Edson Bro's,
ATTORNEYS.

(No Model.) 6 Sheets—Sheet 2.
A. J. MASON.
CONVEYER FOR MAKING ARTIFICIAL EXCAVATIONS FOR WATER COURSES.
No. 592,657. Patented Oct. 26, 1897.
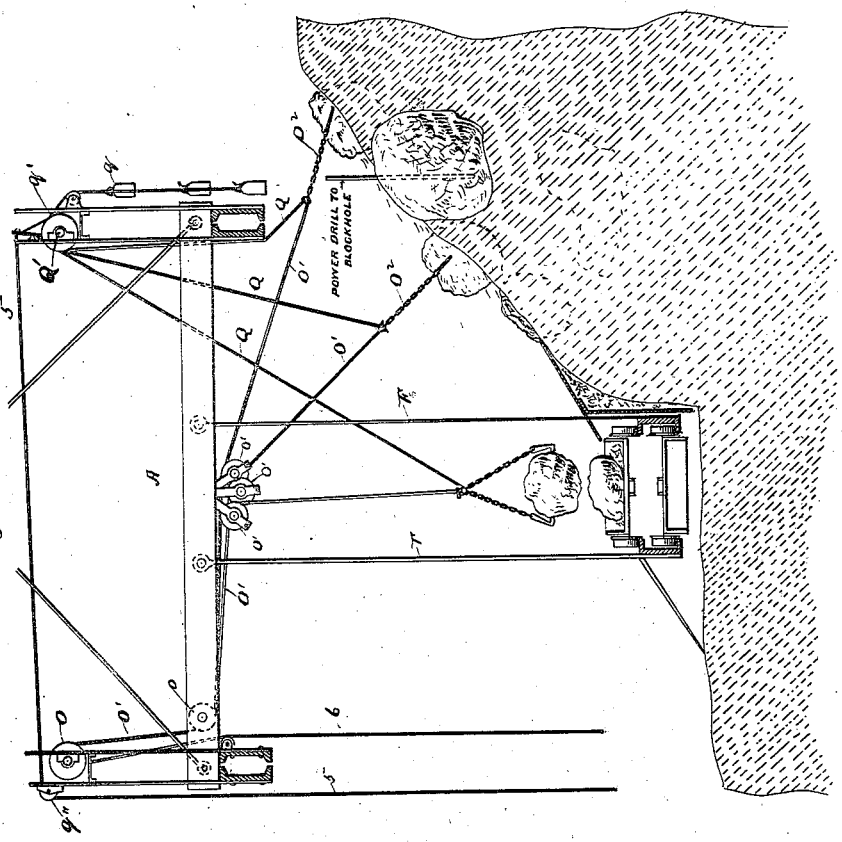
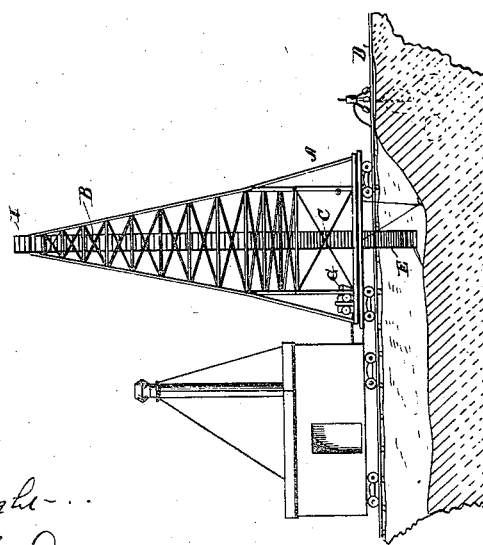

(No Model.)

6 Sheets—Sheet 3.

A. J. MASON.
CONVEYER FOR MAKING ARTIFICIAL EXCAVATIONS FOR WATER COURSES.

No. 592,657.

Patented Oct. 26, 1897.

WITNESSES:
W. H. H. Knight
H. F. Bernhard

INVENTOR
Arthur J. Mason
BY Edson Bro's,
ATTORNEYS.

(No Model.) 6 Sheets—Sheet 4.
A. J. MASON.
CONVEYER FOR MAKING ARTIFICIAL EXCAVATIONS FOR WATER COURSES.

No. 592,657. Patented Oct. 26, 1897.

WITNESSES:
W. H. H. Knight
H. J. Bernhard

INVENTOR
Arthur J. Mason
BY Edson Bros.
ATTORNEYS.

(No Model.)  
6 Sheets—Sheet 5.

A. J. MASON.
CONVEYER FOR MAKING ARTIFICIAL EXCAVATIONS FOR WATER COURSES.

No. 592,657.  
Patented Oct. 26, 1897.

WITNESSES:
W. H. H. Knight
H. Fawchard

INVENTOR:
Arthur J. Mason
BY Edson Bro's.
ATTORNEYS.

(No Model.) 6 Sheets—Sheet 6.
A. J. MASON.
CONVEYER FOR MAKING ARTIFICIAL EXCAVATIONS FOR WATER COURSES.
No. 592,657. Patented Oct. 26, 1897.
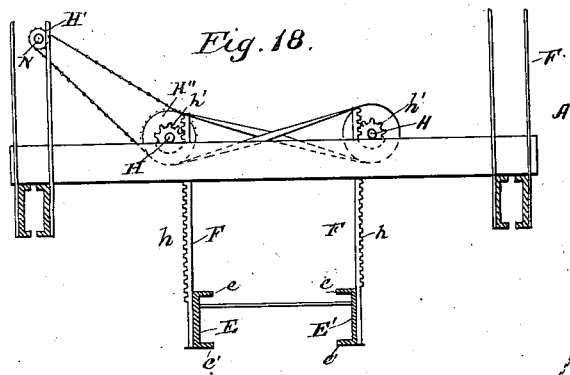
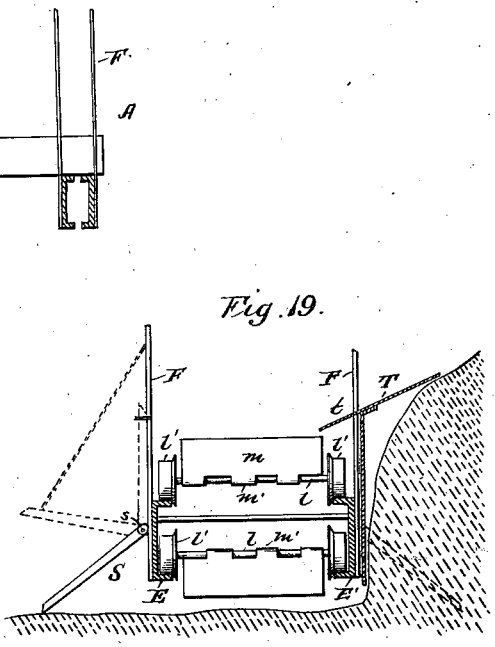
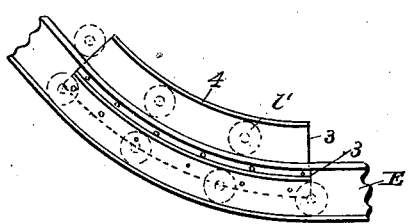
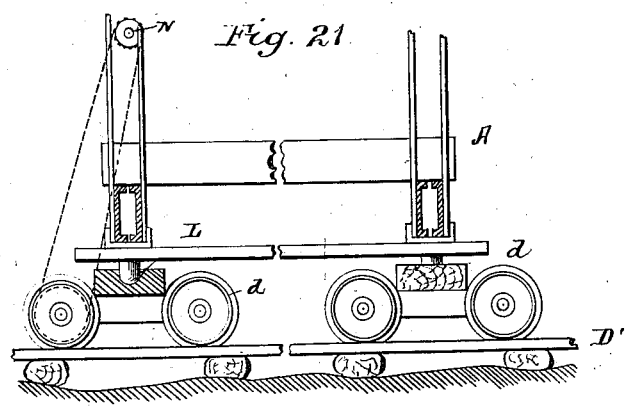
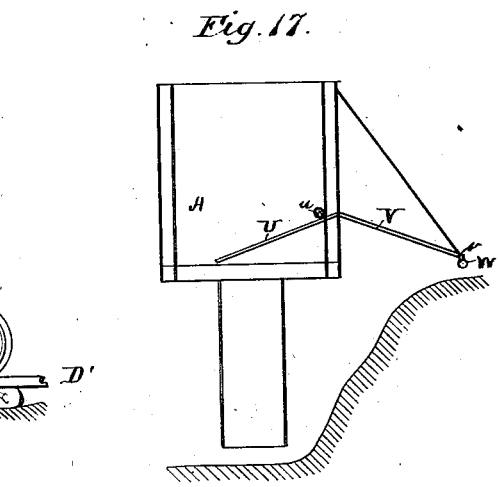
WITNESSES:
W. H. H. Knight
H. A. Bernhard
INVENTOR:
Arthur J. Mason
BY Edson Bro's,
ATTORNEYS.

UNITED STATES PATENT OFFICE.

ARTHUR JOHN MASON, OF KANSAS CITY, MISSOURI, ASSIGNOR OF ONE-HALF TO FRANK K. HOOVER, OF SAME PLACE.

CONVEYER FOR MAKING ARTIFICIAL EXCAVATIONS FOR WATER-COURSES.

SPECIFICATION forming part of Letters Patent No. 592,657, dated October 26, 1897.

Application filed November 2, 1893. Serial No. 489,850. (No model.)

*To all whom it may concern:*

Be it known that I, ARTHUR JOHN MASON, a citizen of the United States, residing at Kansas City, in the county of Jackson and State of Missouri, have invented certain new and useful Improvements in Conveyers for Making Artificial Excavations for Water-Courses; and I do hereby declare the following to be a full, clear, and exact description of the invention, such as will enable others skilled in the art to which it appertains to make and use the same.

The nature of this invention is an adjustable conveyer apparatus for excavating canals, in which are combined the following instrumentalities, to wit: a truss which is designed to span the excavation and supported by traveling carriages on one or more tracks to enable the truss to be moved back and forth parallel to the line of the excavation; a cantaliver-arm carried by said truss at one end and leading therefrom to a suitable point of discharge at some distance from the excavation; a traveling non-cutting conveyer suspended from the truss and extending continuously along the truss and the cantaliver-arm in such position that the excavated earth, rocks, &c., can be loaded thereon by a gang of men working in the excavation and from thence carried along the truss and the cantaliver-arm to the spoil-bank or other place of discharge; means for sustaining the conveyer mechanism at variable distances below the truss to bring the conveyer in proper position for loading the excavated material thereon, so that as the excavation progresses the conveyer can be raised or lowered, according to the depth of the canal; to provide power mechanism whereby large pieces of stone can be hauled out of the face of the slope and deposited on the traveling conveyer, which power mechanism is under manual control and direction and capable of being manipulated so as to prevent swinging motion of the load and to be deposited easily on the conveyer to lessen the liability of damage thereto; to so construct the trucks which sustain the truss and arrange the driving mechanism that either end of the truss can be moved independently of the other end, or both trucks may be operated simultaneously to move the truss in a straight line, said trucks being so sustained that they can turn to accommodate themselves to irregularities in the surface of the ground on which the tracks are laid; and a novel form of conveyer mechanism comprising wheeled axles, dumping-cars hung at the ends on two adjacent axles, a rack on the bottom of each car, and two head-wheels, one at the extremity of the cantaliver-arm and the other at or near the end of the truss, and one of said head-wheels being driven from the engine or motor which furnishes the power to operate the apparatus, and each head-wheel constructed to sustain the dump-cars in proper relation to each other as they pass around said head-wheel, all as will be hereinafter more fully described, and particularly pointed out in the claims.

To enable others to understand my invention, I will now proceed to a detailed description of the preferred embodiment of the invention, reference being had to the accompanying drawings, forming a part of this specification, and in which—

Figure 5:
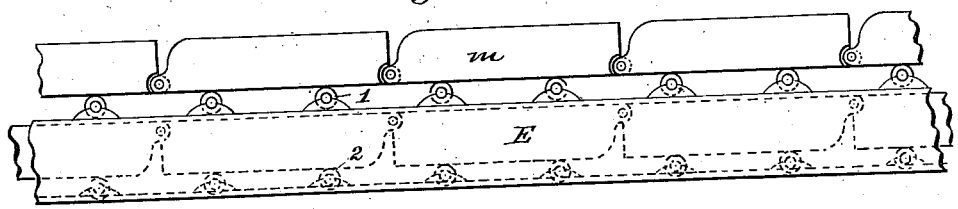
Figure 6:
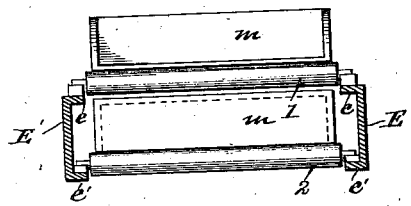
Figure 7:
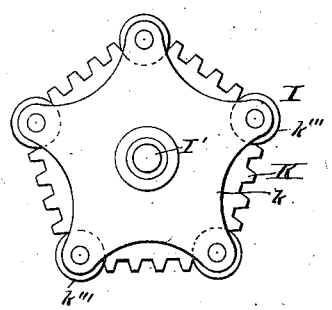
Figure 8:
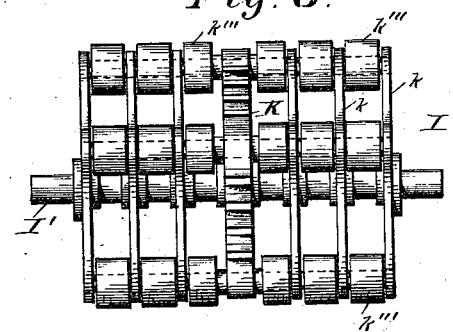
Figure 9:
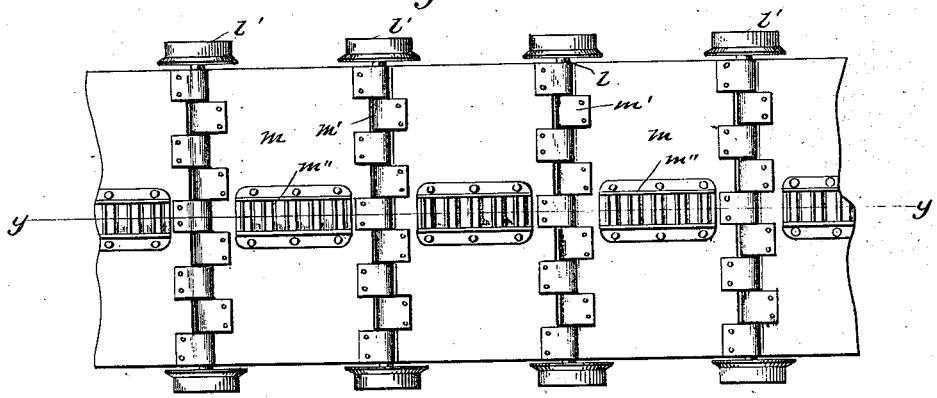
Figure 10:
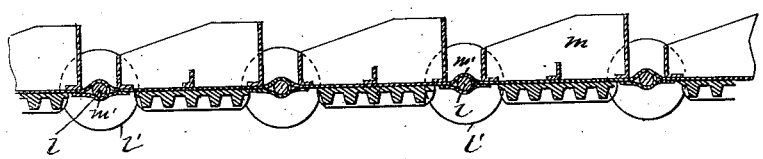
Figure 12:
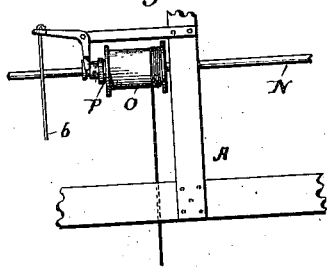
Figure 11:
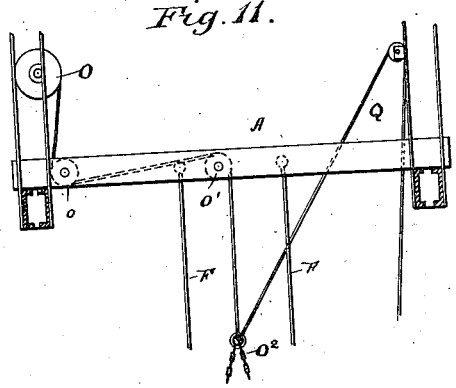
Figure 14:
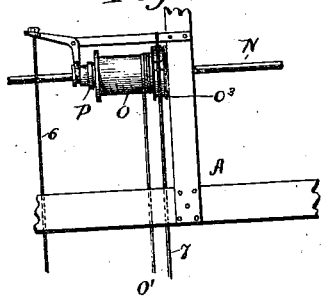
Figure 13:
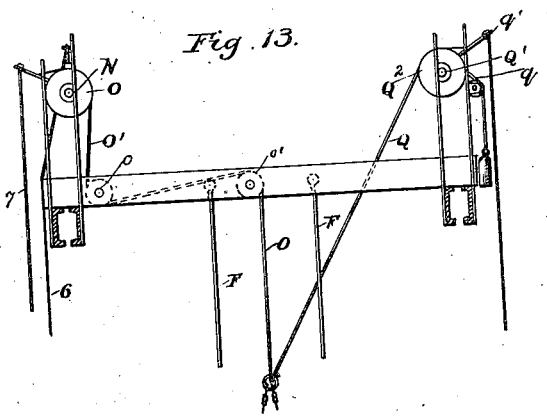
Figure 16:
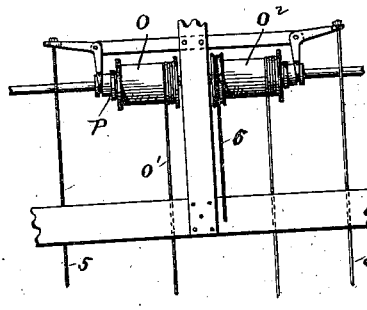
Figure 15:
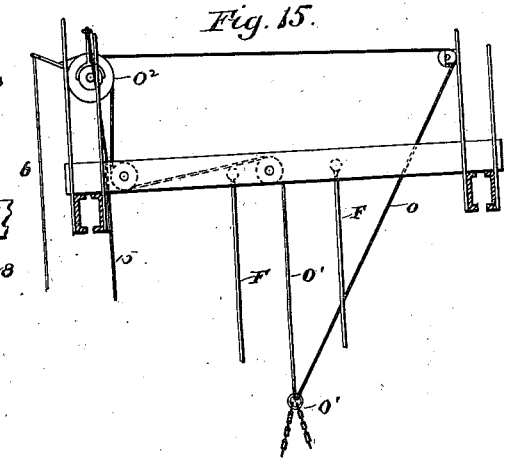

Figure 1 is a side elevation of my apparatus, showing a canal excavation in cross-section. Fig. 2 is an end elevation of the apparatus, showing the cantaliver-arm and a section of the canal on the line of the excavation. Fig. 3 is an enlarged detail view taken transversely through the truss, showing the hoisting mechanism for hauling out large pieces of stone, &c., and loading the same on the traveling conveyer, also illustrating the continuous shield at the bottom of the slope over which the spoil or excavated material is designed to pass by gravity onto the conveyer. Fig. 4 is a detail view in perspective of a portion of my preferred construction of the endless conveyer, having the cars hinged together by wheeled axles and showing the duplex track by which the upper and lower sides of said conveyer are supported. Figs. 5 and 6 are detail views, in side elevation and transverse section, respectively, of a modified form of the endless conveyer, which may be used in lieu of the construction shown by Figs. 4, 9, and 10. Figs. 7 and 8 are detail views, in side elevation and plan, respectively, of one of the head-wheels around which the conveyer is designed to travel. Figs. 9 and 10 are detail views, in bottom plan and longitudinal section, respectively, of the preferred embodiment of the endless conveyer shown by Fig. 4. Figs. 11 and 12 are detail views, in side and end elevation, respectively, of a modified construction of the hoisting mechanism shown by Fig. 3. Figs. 13 and 14 are similar views of another modification of the hoisting mechanism. Figs. 15 and 16 are corresponding views of still another modification of the hoisting mechanism. Fig. 17 is a view illustrating the truss and conveyer by outline and showing an awning for protecting the laborers from the sun and rain. Fig. 18 is a detail view of one embodiment of the mechanism for vertically adjusting the suspended track and endless conveyer. Fig. 19 is a detail view showing the suspended track and conveyer in cross-section and illustrating the dogs or trailers by which said track and conveyer are held from swaying. Fig. 20 is a detail view of one of the guards for preventing the endless conveyer from lifting above the track at the concave part thereof in case the weight of the conveyer is insufficient to cause the wheels to keep to the track. Fig. 21 is a detail view of one of the trucks which sustains one end of the truss.

Like letters and figures of reference denote corresponding parts in all the figures of the drawings.

The leading feature of this invention is a truss A, designed to span a canal or other excavation and carrying a cantaliver-arm B at one end thereof, combined with a traveling conveyer C, of the chain, belt, or apron variety, which is suspended from the truss and extends continuously along said truss and the cantaliver-arm B, as clearly indicated by Fig. 1 of the drawings. The truss A has its parts rigidly united in any approved manner known to those skilled in the art to which this invention relates to produce a substantial rigid structure capable of standing the strains to which it is subjected, due to sustaining the several operative mechanisms of the apparatus and to the traveling movement which it has back and forth in line with the canal excavation. This substantially-constructed truss is of such length that it will span the excavation, and it is sustained at one or both ends in a manner to enable it to have the desired movement in line with the canal excavation. I prefer to sustain both ends of the truss by means of the wheeled trucks $d\ d'$, which are fitted to the tracks D D', which are laid on opposite banks of the canal, as shown by Fig. 1; but I do not confine myself to this particular manner of supporting the trucks, as I am aware that means can be provided for sustaining the truss on one bank of the canal.

The cantaliver-arm B inclines upward from one end of the truss, and its free end terminates at a suitable distance from the excavation and at such height as to deposit the excavated material on a spoil-bank or into wagons, cars, or other vehicles for transporting the material, said cantaliver-arm being constructed and braced in any approved manner and being rigidly united or connected with the truss.

From the truss is suspended the duplex track E, which extends lengthwise along the full length of the truss and is continued along the cantaliver-arm clear up to its free extremity, and as the section of the track which is suspended from the truss is designed to be adjusted vertically it is jointed or connected in any approved manner to that section of the track which is supported by the cantaliver-arm, or, in other words, the two sections of the track, which are respectively suspended from the truss and supported by the cantaliver-arm, are slidably or telescopically joined by overlapping the adjacent ends of the fixed and suspended lengths of the rails or tracks, so as to form a continuous way and accommodate the suspended section for vertical adjustment, according to the depth of the excavation. The track E is suspended from the truss by the ties or rods F, which are attached to the track-rails in a suitable way to avoid interference with the conveyer, and these ties and track-rails are vertically adjustable below the truss. The ties may be raised and lowered by suitable mechanism, either power or manually operated mechanism; but I prefer to employ a power mechanism actuated by the engine or motor G, carried by the truss and which supplies the power necessary to operate the plant.

As one mechanism for raising and lowering the track and conveyer I have shown by Fig. 18 of the drawings a series of racks $h$ on the suspending ties or rods F, with which racks mesh the gear-pinions $h'$, carried by the shafts H, suitably journaled in bearings on the truss A, and each shaft H further carries a sprocket-wheel H'', with which engages a sprocket-chain that is common to all of the tie-operating shafts H, said sprocket-wheel H' on a counter-shaft N, which is rotated by connections with the motor or engine G, a clutch mechanism being provided to throw the counter-shaft into and out of gear with the motor or engine; but I would have it understood that I do not confine myself to this mechanism for adjusting the track and conveyer, as other mechanisms can be used in lieu thereof without departing from the spirit of this invention.

The track consists of the rails E E', sustained in parallel positions relative to each other, and each rail has duplex flanges $e\ e'$, which extend longitudinally thereof at the bottom and top, respectively, the flanges on the adjacent rails extending inwardly toward each other to afford the duplex bearing-surfaces at the upper and lower edges of the track-rails for the upper and lower sides of the conveyer. This conveyer may be of the endless link chain or apron variety, and it passes around the head-wheels I J, located, respectively, at the free extremity of the cantaliver-arm and near the opposite end of the truss. The head-wheel I at the extremity of the cantaliver-arm is the driving-wheel by which the conveyer is caused to travel continuously, and this wheel I is driven by connections with the motor or engine G—as, for instance, by a sprocket-chain $i$, which passes around a sprocket-wheel on a shaft $i'$, driven from the engine G, and a similar sprocket-wheel $i''$ on the shaft I' of the head-wheel I, said shaft I' being journaled in suitable bearings on the cantaliver-arm. The other head-wheel J is an idler-wheel to serve as the support around which the return side of the endless conveyer passes to the upper side of the track, and the shaft $j$ of this head-wheel is journaled in suitable supports attached to the pendent tie or to the end of the track E E'. Each head-wheel is composed of the central master-gear $k$ and the disks $k'$, arranged in series on opposite sides of the master-gear, and the series of disks and master-gear being connected by tie rods or bolts, on which are loosely mounted the friction wheels or rollers $k'''$, said disks being properly spaced by collars or sleeves on the shaft. This construction of the head-wheel affords the necessary support to the dumping-cars of the conveyer, as they pass around the wheels, to preserve the alinement of the axles and prevent them from twisting, thereby obviating undue strain on the parts of the conveyer, and the master-gear meshes with racks on the bottom of each dumping-car to propel the conveyer.

The conveyer which I employ is of the non-cutting variety, as distinguished from a chain of scraping-buckets used in excavators or dredgers; but in my present invention this conveyer serves only to deport the excised material from the excavation to a spoil-bank or other point of discharge at one side of the lines of the excavation. My conveyer mechanism is suspended from the truss within the lines of the excavation and it is presented laterally or sidewise to the sloping end face of the excavation, said conveyer lying adjacent to the base of the end sloping face of the excavation, as shown in Fig. 3, in order that the conveyer may intercept the material dislodged from said sloping end face, whereby the conveyer is loaded automatically with the dislodged material and the material may be deposited thereon at any or all points across the width of the excavation, thus effecting economy in labor required to deport the material and securing greater transportation capacity for the conveyer. In my non-cutting conveyer, designed to intercept the excised material and to be loaded automatically therewith at any or all points across the lines of an excavation, it is made adjustable within the lines of an excavation to adjust the conveyer to the depth of the cut in the earth as the work progresses, and the apparatus is equipped with means for advancing the truss and said non-cutting conveyer laterally, but in the general direction of the line of the excavation, for the purpose of enabling the truss and conveyer to assume new positions as the work of excavating progresses, the truss and conveyer being thus brought to the work. The conveyer which I prefer to use is of the novel construction shown by Fig. 4 of the drawings, and it consists of a series of axles $l$, each provided with the carrying-wheels $l'$, and the series of dumping-cars $m$, each of which has its ends connected to two adjacent axles of the series by suitable hinge or pivot joints $m'$. These cars have their bottoms made of sheet metal, which is cut to form a series of tongues, which are bent or looped around the axles to form the eyes $m'$, that constitute the hinge-joints between the axles and cars; but it is evident that the cars can be connected to the axles in different ways from that herein shown and described. It is to be remarked, however, that this manner of connecting the cars to the axles gives large area for friction under the heavy strain necessary to keep the conveyer in motion. Each car is provided with the longitudinal rack $m''$, which is fixed centrally to the bottom thereof in such position that the master-gear $k$ will mesh therewith as the car passes around said master-gear, and the car has the rear end thereof raised to form the end board and is provided with one or more vertical bars, as shown, which serve to prevent dislodgment of the material when the cars travel up the incline afforded by the cantaliver-arm, but the front end of the car is open for the purpose of discharging the material when the car passes around the head-wheel I, as indicated by Fig. 4 of the drawings. It will be noted that the cars on the upper flanges $e$ of the track assume an upright position suitable for loading the spoil thereon and conveying the same along the truss and cantaliver-arm to the point of discharge over the head-wheel I, after which the cars are inverted as they are returned along the lower flanges $e'$ of the track to the opposite head-wheel J, and as they pass around the latter they again assume the proper position, right side up, to be again loaded with the spoil from the excavation while passing below the truss.

Although I prefer to employ the form of conveyer hereinbefore described, and illustrated in Fig. 4 of the drawings, yet I do not strictly confine myself to this particular kind of conveyer, as I am aware that an endless conveyer similar to those used in bucket-dredges and which I have shown by Figs. 5 and 6 can be used in this invention. In this construction of the conveyer the upper and lower parts of the duplex tracks $e\ e'$ have the lower and upper series of rollers 1 2, which are spaced at suitable intervals and are journaled in bearings on the track, and the cars $m$ are pivoted or hinged together in the manner substantially as shown by Fig. 5. The sides and rear ends of the cars $m$ in Figs. 5 and 6 are closed and the bottoms of the cars rest upon said rollers 1 2 to slide easily thereon. As these cars are necessarily closed on both sides, I prefer to use the conveyer shown by Fig. 4, because the cars are connected to the axles in a manner which enables me to use cars having open sides adjacent to the slope or land side of the excavation and next to the gang of men engaged in loading the cars. This construction of the cars on the endless conveyer is advantageous, as the amount of work which a man will accomplish in a given time is largely governed by the height which he is required to lift the material. Hence it is important to have the cars with low sides adjacent to the work and to suspend the conveyer and its track low or near to the ground in order that the workmen can easily throw the spoil into the cars when the conveyer is loaded manually.

In a track and conveyer constructed with horizontal and inclined parts supported, respectively, by the truss and the cantaliverarm, there are two points where the strain on the conveyer may cause the wheels on the axles of the hinged cars of the conveyer to raise from the flanges of the track. These points are at either side of the excavation where the grade of the suspended track is concave, or, in other words, where the horizontal and inclined parts of the track are joined, but continuous with each other, and to overcome this tendency of the strain of the power head-wheel I on the conveyer to lift the wheels above the tracks, provided the weight of the conveyer is insufficient to keep the wheels down on the tracks, it is my purpose to use the guards 3 3, (shown by Fig. 20,) which guards are rigidly attached to the members of the track E E' along the concave parts thereof, and which guards have overhanging flanges 4, that bear upon the top sides of the wheels on the axles of the conveyer, and which guards serve to hold the wheels down upon the track-flanges. In case the weight of the conveyer is sufficient to keep the wheels thereof to the track-flanges, or the track is so formed that the wheeled conveyer will travel normally on the track, I dispense with these guards.

Although I have shown and described the sprocket-chain $i$ for driving the head-wheel I from the engine or motor G, I do not limit myself to this sprocket-chain, as I may use a transmitting rope or cable or any equivalent means for operating the head-wheel I from an engine.

I will now proceed to describe the preferred embodiment of my mechanism for independently moving either of the trucks $d\ d'$, which sustain the opposite ends of the truss A, in which embodiment of the invention I prefer to gear one of the trucks $d$ directly to the engine or motor G, and the other truck $d'$ is geared to and driven from a long counter-shaft N, which is geared to the engine; but I do not strictly confine myself to the use of this long counter-shaft N, as I may use an independent engine at the free end of the truss and gear the truck $d'$ to said independent engine. In said embodiment of the mechanism for propelling the trucks and the truss the truck $d$ at that end of the truss immediately below the motor or engine G is geared directly to said engine to be operated thereby, but the other truck $d'$ below the outer end of the truss is driven by the counter-shaft N, which extends longitudinally of the truss and is journaled in suitable bearings thereon. This longitudinal counter-shaft N has one end geared to the engine, so as to be propelled continuously thereby, while its other end is connected by intermediate gearing to the truck $d'$ to drive the latter either forward or backward, suitable reversing mechanism being provided for this purpose. Each truck $d\ d'$ is connected with the truss by joints which admit of the truck turning vertically and horizontally beneath the truss, which is for a twofold purpose—i. e., first, to enable the truck to be turned to an angular position horizontally relative to the line of the truss to accommodate the forward or backward movement of either end of the truss independently of the other end thereof, which may be desirable in view of the character of the work or the condition of the excavation, and, second, to provide for irregularities in the surface of the ground on which the tracks are laid. It sometimes occurs in the excavation, as the work progresses, that it is desirable to advance or recede one end of the truss more than the other end or to bring the truss to an inclined position across the excavation, and this is accomplished in my apparatus by connecting the truss by joints which admit of the horizontal angular adjustment of the trucks relative to the longer axis of the truss and by driving the trucks independently from a common engine or from independent engines, as may be desired. As one embodiment of the means for connecting the trucks to the truss to accommodate the desired tilting and horizontal adjustments of the trucks I have shown a swiveled bearing L in Fig. 21 of the drawings, in which the bearing is shown as consisting of the socket on the truck and the pendent head on the truss, which head fits snugly in the socket and has sufficient play therein to secure desired ends; but it is evident to a skilled mechanic that this bearing can be dispensed with by fitting the truck on a vertical king-bolt and hinging it to a tumbler-rod, or other means employed for securing the desired independent play of the trucks and truss.

In the practical operation of excavating a canal two kinds of spoil are required to be excavated and removed, one kind consisting of soft earth interspersed with large rocks or boulders and the other kind consisting of rocky soil. In excavating the soft earth I arrange the apparatus alongside of the slope of the bank at the bottom of the sloping face and employ a continuous shield, over which the spoil, after being loosened by picks and shovels in the hands of a gang of laborers, is allowed to pass or flow by gravity upon the cars of the endless conveyer. Any large rocks encountered in this kind of spoil are designed to be hoisted out of the face of the slope and deposited upon the endless conveyer by power-operated hoisting mechanisms under the manual control of the attendant, while large boulders are "blockholed," broken up, and the fragments are deposited on the conveyer. In Fig. 3 of the drawings I have shown this plan of excavating the spoil by manual labor, loading the loosened earth automatically on the conveyer by allowing it to descend the face of the slope, and of hoisting out the rock and loading the pieces of stone or rock by the power mechanism.

In excavating in rocky soil, as indicated in the general cross-sectional view Fig. 1 of the drawings, power-drills are employed to bore holes in the rock, and previous to firing a blast the truss and other parts constituting my apparatus are run back by power from the engine or engines to a safe distance from the slope, after which the blast is fired and the apparatus again brought up to the slope and the suspended track and conveyer are adjusted, either raised or lowered, so that the loosened earth, rocks, &c., can be loaded thereon, preferably by manual labor and by the power-operated hoisting mechanism.

To provide for hauling out the rocks and pieces of stone from the slope and depositing the same on the conveyer, I employ the power mechanism shown by Figs. 3 and 11 to 16, inclusive. This power-operated hauling mechanism consists of a series of friction-drums O and hauling-cables O', provided with grapples O². The valuable features of this hauling mechanism consists in having a series of these friction-drums and grapples spaced at suitable intervals along the truss, so as to be convenient for pulling out the rocks or loading the stone on the conveyer at suitable intervals along the face of the slope, said hauling mechanisms being under manual control. The friction-drums are designed to be operated by power derived from the primary motor or engine G, through the medium of suitable mechanical appliances driven from the engine, one embodiment of which consists in utilizing the counter-shaft N for this purpose; but I may employ a series of independent engines on the truss, one for actuating each of the friction-drums O to coil the hoisting-cable O' thereon. In the embodiment of this part of my invention shown in the accompanying drawings the continuous counter-shaft N carries the entire series of friction-drums O, each of which is loosely mounted on said shaft N to be independent thereof, and each drum is designed to be made fast to the shaft N, through the agency of a friction-clutch P, which is of any preferred construction and which is keyed to the shaft N, so as to rotate therewith and yet have the necessary endwise movement thereon to engage with or to be disengaged from the friction-drum. The counter-shaft N and friction-drum O being preferably located at one side of the truss, the hauling-cable O' passes beneath a guide-sheave o immediately beneath the drum and over another guide-sheave o', which is arranged in the line of the vertical axis of the track and conveyer, or immediately above said parts, the grapple O² being of any preferred form. To control the load after it has been hauled out of or lifted from the face of the slope and prevent said load and the cable O' from having a swinging or pendulum-like motion, which if unrestrained is liable to cause the load to strike and damage the track or conveyer, I provide a tag or guy rope Q, which is designed to be manually controlled, and to enable the load to be easily or gently deposited on the conveyer, and thereby obviate the liability of damage to the apparatus, I provide mechanism for manually controlling the descent of the load upon the conveyer.

In Fig. 3 I have illustrated the preferred construction, in which the guy or tag rope Q is coiled around and attached to a drum Q', which is journaled in bearings on the truss and located on the opposite side of the truss to the friction-drum O, and this drum Q' is counterweighted at q to normally take up the slack in the line Q and prevent the latter from being entangled with the apparatus. The rotation of the drum Q' is controlled by means of the brake q', preferably in the form of a spring-band, which is controlled by a pull-cord 5, which leads over guide-sheaves q'' and depends from the truss within convenient reach of the attendant standing alongside of the suspended conveyer, and another pull-cord 6 depends from the lever that controls the friction-clutch P, so that the brake and drum Q' can be controlled by one pull-cord, while the friction-clutch and its associated drum are controlled by the other pull-cord. In operation the grapple O² is connected to the rock or piece of stone, as in Fig. 3, the drum Q² is held by pulling on the cord 5 to apply the brake, and the other pull-cord 6 is operated to throw the clutch P into engagement with the friction-drum O, and thereby make the drum O fast with the counter-shaft, whereupon the drum is rotated to coil the cable O' thereon and hoist the load to the elevated position directly over the conveyer in the dotted position shown, the line Q preventing the load from having the swinging pendulum-like motion. The brake is now released from the drum Q², and by modifying the pull on the cord 5 the friction between the drum O and the clutch P is varied, so that the load can be gently deposited on the conveyer. In Figs. 11 and 12 a modified construction of this loading mechanism is shown, in which I employ a single drum controlled by a friction-clutch and pull-cord. A brake is applied to this friction-drum directly and controlled by another pull-cord, and the tag-rope leads over the guide-sheaves on the truss and depends within convenient reach to be controlled by hand. Another modification (shown by Figs. 13 and 14) consists in having two drums O Q², the brake O³ on the friction-drum O, which is controlled by the cord 7, the brake q' on the drum Q², controlled by the cord 5, the friction-clutch P, operated by the cord 6, and the guy or tag rope attached to the drum Q, the friction-drum O being controlled by the brake and the friction-clutch. A further modification (shown by Figs. 15 and 16) consists in having the two drums O Q² fitted loosely on the counter-shaft N alongside of each other, two friction-clutches keyed to the shaft N and one adapted to the drum O and the other adapted to the drum Q², and said clutches being operated by the cords 5 8, respectively, and two brakes applied to the two drums and operated independently by cords. In this arrangement the guy or tag rope is led to the drum Q² across the truss, around a sheave, and thence down to the hauling-cable Q near to the grapple. The drums O Q² may be placed opposite to each other—that is, on the same line at right-angles to the axis of the conveyer—or they may be placed obliquely with regard to each other and to the axis of the conveyer, as the work each pair of drums is required to do may render advisable.

In Fig. 19 of the drawings I have shown means for holding the suspended track and conveyer steadily in place relative to the slope and preventing the track and conveyer swaying, so that the spoil can be loaded thereon automatically without displacing the conveyer by pressure of the earth or spoil against the near side thereof. This means consists of the dogs or trailers S, which are carried by the track and adapted to take into the bottom of the excavation. The dogs or trailers may be located on the off side of the track, away from the slope, so as to keep the track and conveyer from being pushed by the spoil, which descends the face of the slope, out of position, although the trailers may be used on both sides of the conveyer or track, as shown, to steady the track. The trailers are hinged or pivoted to the track, as at s, and when the track and conveyer are to be raised or lowered or when the apparatus is to be moved in line with the excavation the trailers are folded up alongside of the track and fastened in place by any suitable means, as indicated in Fig. 19.

In excavating soft earth, which is designed to be loaded on the conveyer by permitting the material after it has been loosened by pick and shovel to descend the face of the slope by gravity, I provide the continuous inclined shield T, which is placed between the side of the conveyer and track and the bottom of the slope, and at its upper edge this shield has an overhanging flange t, which extends over the conveyer, whereby the material is adapted to pass over the shield and into the cars m at the open sides thereof; but at the same time the material cannot pass between the top and bottom parts of the conveyer or on the track E E' to clog up and interfere with the necessary free motion of the conveyer. This shield is moved from time to time as the excavation progresses. I have also provided an awning for protecting the gang of laborers from the heat of the sun's rays in the summer-time and from rain, so that the work of excavation can be carried on without regard to the state of the weather. This awning is carried by the truss A, and in Fig. 17 I have shown it as consisting of the oppositely-inclined rafters U V, attached to the truss at the side adjacent to the slope and stayed by suitable braces, and the pliable covers u v, adapted to be unrolled from the rollers W and to rest on the inclined rafters, said rollers W being actuated either by power-operated mechanism or by hand. One side of this awning overhangs the slope on which the men are engaged at work and the other side lies over the conveyer, so that the workmen will be shielded while engaged in the excavation beneath the truss A.

This being the construction of my canal-excavator, the operation may be briefly described as follows: A gang of workmen are employed on the excavation, engaged in digging and shoveling, to loosen the earth and deposit it on the conveyer C until a suitable depth is reached, which gives to the excavation the desired slope, as seen in Figs. 2 and 3. The conveyer C and the track E E' on which it is supported can be lowered to the proper height suitable for loading the spoil thereon, and the conveyer is continuously driven from the engine, so as to present fresh cars to be filled and convey the filled cars to the end of the cantaliver-arm to be discharged upon a spoil-bank or into suitable vehicles. As the depth of the excavation is increased the conveyer is lowered in the manner described, and as the work of excavating progresses the truss and the mechanism sustained thereby are moved forward by power derived from the engine or engines and transmitted by the shaft N and the gear mechanisms or equivalent devices to the trucks. When the excavation has reached the desired depth and the face of the slope thereby pitched at the proper angle for the spoil to descend by gravity, I place the shield T at the base of the slope and adjust the truss so that the sides of the conveyer and the track will be close alongside of the shield, whereby the spoil is adapted to be automatically loaded on the traveling conveyer; but at the same time the conveyer is suspended so low relative to the work that the laborers can throw the dirt, &c., into the cars very easily as the sides of the cars are open, as before explained.

In the work of rock excavation I design to use power-drills for boring the material. The holes are charged with a high explosive, and before the blast is fired the truss and the mechanisms thereon are run back from the slope to a safe distance, after which the blast is fired and the truss again brought close to the slope, so that the pieces of stone, earth, &c., can be easily loaded thereon. Any large boulders that may be encountered are blockholed and broken up and the pieces of stone, rocks, &c., which are too large to be handled by the men are lifted by the hoisting mechanisms and deposited on the conveyer.

Having thus fully described my invention, what I claim as new, and desire to secure by Letters Patent, is—

1. In a conveyer apparatus for making artificial excavations, the combination of the tracks situated on opposite sides of and substantially parallel to the axial line of an excavation, a truss which spans the excavation substantially at right angles to the axis thereof, the trucks adapted to said tracks and connected to the opposite ends of said truss to support the latter laterally adjacent to the sloping end face of the excavation, a motor or engine, independent connections between the motor and the two trucks for moving either truck independently of the other and advancing the truss in the general direction of the line of the excavation, and a non-cutting conveyer suspended from the truss within the lines of an excavation and sustained thereby laterally adjacent to a sloping end face of said excavation, as and for the purposes described.

2. In a conveyer apparatus for making artificial excavations, the combination of independent trucks situated on opposite sides of an excavation, a truss which spans the excavation and has its respective ends connected to said trucks to be supported thereby laterally adjacent to the sloping end face of the excavation, an engine or motor carried by one truck, direct gear connections between one truck and the motor, a counter-shaft journaled longitudinally on the truss and geared to the motor and the other truck, and a non-cutting conveyer suspended from the truss within the lines of the excavation and supported laterally adjacent to the sloping end face thereof to intercept the material dislodged from the same, as and for the purposes described.

3. In a conveyer apparatus for making artificial excavations, the combination of a truss arranged substantially at right angles across the axial line of an excavation, the independent trucks arranged to sustain the respective ends of said truss, horizontal and vertical pivotal connections between said truss and the trucks, a motor having direct gear connections with one truck, a counter-shaft geared to said motor and the other truck, a non-cutting conveyer suspended from the truss within the lines of an excavation, laterally adjacent to, and arranged to intercept the material dislodged from, the sloping face of said excavation, as set forth.

4. In a conveyer apparatus for making artificial excavations, the combination of a truss mounted at its ends on movable trucks and arranged to span an excavation substantially at right angles to the axial line thereof and sustained by said trucks laterally adjacent to a sloping end face of the excavation, a continuous track suspended from said truss within and closely adjacent to the bed, side and sloping end face of the excavation, a non-cutting endless conveyer conforming to the track and sustained thereby laterally adjacent to the sloping end face of an excavation in position to intercept material dislodged from the same, and a power mechanism for impelling the conveyer in a path at right angles to the axial line of the excavation, as and for the purposes described.

5. In a conveyer apparatus for making artificial excavations, the combination of a truss provided with a cantaliver-arm, mounted on movable trucks and arranged to span an excavation substantially at right angles to the axial line thereof and sustained by the trucks laterally adjacent to a sloping end face of the excavation, a continuous track having upper and lower parts for an endless conveyer, a certain length of said track being supported in a fixed relation on the truss and its cantaliver-arm and the remaining length of said track suspended from, and vertically adjustable with relation to, the truss, said suspended length of the track arranged within and closely adjacent to the bed, side and sloping end face of the excavation, means for positively raising or lowering the suspended length of said track, a non-cutting endless conveyer adapted to the continuous track and supported thereby laterally adjacent to the end slope of the excavation to intercept the material dislodged from the same, and mechanism for impelling the endless conveyer to travel in a path at right angles to the axial line of an excavation, as and for the purposes described.

6. In a conveyer apparatus for making artificial excavations, the combination of a truss supported at its ends by independent trucks and arranged to span an excavation substantially at right angles to the axial line thereof and sustained by the trucks laterally adjacent to the sloping end face of the excavation, a non-cutting endless conveyer suspended from one part of the truss and sustained thereby within the lines of an excavation laterally adjacent to the end slope of an excavation to intercept material dislodged from said end face, an engine, means driven by the engine for moving the trucks and thereby advancing the truss and conveyer laterally and in the direction of the line of an excavation, and means for impelling the conveyer in a path at right angles across the axial line of the excavation and in a general direction along the truss, substantially as and for the purposes described.

7. In a conveyer apparatus for making artificial excavations, the combination of a truss provided with a cantaliver-arm and sustained at its ends by movable trucks across an excavation substantially at right angles to the axial line thereof and laterally adjacent to a sloping end face of the same, a continuous track having a certain length thereof sustained in fixed relation on the truss and its cantaliver-arm and the remaining length of said track suspended in a horizontal position from the truss and within the lines of an excavation and laterally adjacent to the end slope of the same, independent head-wheels at opposite ends of the fixed and suspended lengths of said continuous track, an endless non-cutting conveyer adapted to the continuous track and having its suspended length sustained by the suspended length of the track in a position laterally adjacent to the end slope of an excavation, to intercept material dislodged from the same, and means for impelling said conveyer in a path at right angles across the axial line of the excavation, substantially as and for the purposes described.

8. In a conveyer apparatus for making artificial excavations, the combination of a truss provided with a cantaliver-arm and sustained at its ends by movable trucks across an excavation substantially at right angles to the axial line thereof and laterally adjacent to a sloping end face of the same, a continuous track having a certain length thereof supported fixedly on the truss and its cantaliver-arm and its remaining length suspended in a horizontal position from the truss, within the lines of an excavation and laterally adjacent to the end slope of the same, an endless conveyer having its upper and lower sides fitted to the upper and lower lengths of said track to which the conveyer conforms and is thereby sustained laterally adjacent to the end slope of an excavation to have its upper side intercept the material dislodged from said end slope, and means for impelling the conveyer in a path substantially at right angles to the axial line of an excavation, substantially as and for the purposes described.

9. In a conveyer apparatus for making artificial excavations, the combination of a truss provided with a cantaliver-arm and sustained at its ends by trucks across an excavation substantially at right angles to the axial line thereof and laterally adjacent to a sloping end face of the same, the continuous track having a certain length thereof sustained fixedly on the truss and its cantaliver-arm and its remaining length suspended in a horizontal position from the truss, within the lines of an excavation and laterally adjacent to a sloping end face of the same, a non-cutting conveyer having the open pans and the wheeled axles which are adapted to travel on the upper and lower lengths of the horizontal and inclined parts of said track, a part of said conveyer being sustained by the suspended length of the track laterally adjacent to a sloping end face of the excavation, the independent head-wheels at the ends of the inclined and horizontal lengths of said track, and means for rotating the head wheel or wheels to impel the conveyer in a path substantially at right angles across the axial line of an excavation, as set forth.

10. In a conveyer apparatus for making artificial excavations, the combination with a truss supported on movable trucks, of a track pendent from said truss and provided with upper and lower bearing-surfaces, the power and idle wheels provided with friction-rolls at the peripheries thereof and arranged at the terminals of said track, and an endless conveyer having the connected cars and axles and fitted to said bearing-faces of the track and also fitted to the head-wheels to be sustained in proper relation by the friction-rolls, as and for the purposes described.

11. In a conveyer apparatus for making artificial excavations, the combination with a truss, of a track having upper and lower bearing-surfaces, an endless conveyer having the wheeled axles adapted to said bearing-surfaces and cars hinged to said axles and provided with longitudinal racks, an idler head-wheel at one end of the track, and a positively-driven head-wheel at the opposite end of the track, said head-wheel carrying a master-gear adapted to mesh with the racks of the cars as they approach said head-wheel, each wheel carrying a transverse series of friction-rolls to sustain the cars in proper position as they pass around the head-wheels, substantially as described.

12. In a conveyer apparatus for making artificial excavations, the combination of a truss arranged to span an excavation substantially at right angles to the axial line thereof and mounted on trucks adapted to travel in the general direction of the line of the excavation, an engine, a longitudinal counter-shaft carried by said truss, a traveling conveyer suspended from said truss within the lines of an excavation and presented by the truss laterally adjacent to a sloping end face thereof, gearing between the engine and counter-shaft, means for connecting the counter-shaft with one of the trucks, a hoisting-drum carried by said counter-shaft to rotate therewith, and arranged thereon over the conveyer and a cable connected to said hoisting-drum and provided with a grapple, as and for the purposes described.

13. In a conveyer apparatus for making artificial excavations, the combination with a truss, an engine, and a counter-shaft, of a traveling conveyer suspended from said truss within the lines of an excavation and presented by said truss laterally adjacent to an end face of said excavation; a series of hoisting-drums carried by said shaft over the conveyer and having means for making the same fast with said counter-shaft, a cable connected to each drum and provided with a grapple, and a brake mechanism for controlling each of said drums and its load when the drum is released from fixed engagement with said shaft as and for the purposes described.

14. In a conveyer apparatus for making artificial excavations, the combination of a truss sustained by movable trucks, a motor on one of said trucks, a track suspended from said truss, head-wheels situated at the terminals of the track, one of said wheels driven from said motor, an endless conveyer fitted to the track and the head-wheels, a longitudinal counter-shaft geared to the engine and hoisting mechanism operated by said counter-shaft and embodying friction-drums, cables, and means for controlling each drum, as and for the purposes described.

15. In a conveyer apparatus for making artificial excavations, a truss mounted on carriages and arranged to span an excavation substantially at right angles to the axial line thereof and presented laterally or sidewise to the sloping end face of said excavation, a track suspended from the truss within the lines of an excavation and presented laterally to the sloping end face of the excavation, a continuous shield arranged outside of the track to afford lateral protection to the same and having a flange which overhangs the side of the conveyer and its track adjacent to the end slope of said excavation, and a traveling conveyer fitted to the track and lying within the continuous shield, the upper receiving side of said conveyer being exposed for receiving the material which is dislodged from the end face of said excavation and deported over the continuous shield, substantially as and for the purposes described.

16. In a conveyer apparatus for making artificial excavations, the combination of a truss supported by movable trucks and arranged to span an excavation substantially at right angles to the axial line thereof, an endless conveyer suspended from the truss partly within the lines of an excavation and sustained thereby laterally or sidewise adjacent to the end face of said excavation, a series of independent hoisting mechanisms mounted at suitable intervals along the truss and above the conveyer, and manually-operative devices whereby each hoisting mechanism may be controlled to deposit its burden on said conveyer, as and for the purposes described.

17. In a conveyer apparatus for making artificial excavations, the combination of a truss supported by trucks to span an excavation, an endless conveyer supported by the truss within the lines of the excavation and arranged laterally adjacent to sloping end face thereof, a friction-drum mounted on the truss above the conveyer and having a hoisting-cable, means for rotating said friction-drum, and means for controlling the friction-drum to lower the burden of the hoisting-cable and deposit the same upon the conveyer, as and for the purposes described.

18. In a conveyer apparatus for making artificial excavations, the combination of a truss supported by trucks to span an excavation, an endless conveyer supported by said truss within the lines of the excavation, a friction-drum journaled on the truss above the conveyer, a shaft on which the friction-drum is mounted, a friction-clutch on the shaft, adapted to engage the drum, means for operating said clutch, a hoisting-cable, and a tag-rope as and for the purposes described.

19. In a conveyer apparatus for making artificial excavations, the combination of a truss mounted on trucks to span an excavation, a conveyer suspended from said truss within the lines of the excavation, a friction-drum having associated therewith means for controlling the same, a hoisting-cable guided by sheaves or rollers to suspend its load immediately over said conveyer, and means combined with the hoisting-cable to steady the load against swaying, as and for the purposes described.

20. In a conveyer apparatus for making artificial excavations, the combination of a truss supported on trucks to span an excavation, a conveyer suspended from said truss within the lines of the excavation and presented edgewise to the sloping end face of said excavation, a hoisting-drum, a cable attached to said drum and guided by sheaves or rollers to suspend its burden over said conveyer, a guy or tag rope connected to the hoisting-cable, and devices for rotating and controlling said hoisting-drum, as and for the purposes described.

21. In a conveyer apparatus for making artificial excavations, the combination of a truss carried on trucks to span an excavation, a conveyer suspended from said truss within the lines of the excavation and presented laterally to a sloping end face of the same, a friction-drum carried by the truss above the conveyer and having a hoisting-cable guided by sheaves or rollers to suspend its burden over the conveyer, another drum carried by the truss at one side of the conveyer, a guy-rope connected to the hoisting-cable and the independent drum, and a friction-clutch rotating with a shaft, as and for the purposes described.

22. In a conveyer apparatus for making artificial excavations, the combination of a truss carried by trucks to span an excavation, a conveyer suspended from said truss within the lines of an excavation and presented laterally adjacent to the sloping end face of the same, a friction-drum carried by said truss and having a friction-clutch and a shaft whereby the drum may be rotated, an independent drum also carried by the truss but situated at one side of the friction-drum, a hoisting-cable attached to the friction-drum and guided by sheaves to suspend its burden over the conveyer, another cable connected with the hoisting-cable and the independent drum, and a brake mechanism for controlling the drum, as and for the purposes described.

23. In a conveyer apparatus for making artificial excavations, the combination with a truss carried by trucks to span an excavation, a conveyer suspended from said truss within the lines of the excavation, a hoisting-drum, a shaft, a friction-clutch, a hoisting-cable, a tag-rope connected with the hoisting-cable, a counterweighted independent drum to which the tag-rope is connected, and a brake mechanism of the drum, as and for the purposes described.

24. In a conveyer apparatus for making artificial excavations, the combination with a truss, of a horizontal track suspended therefrom, a traveling conveyer fitted on said track, and props connected to said track and extending outwardly therefrom substantially at right angles to the length of the track, said props resting on the ground to hold the track and conveyer from swaying away from the end face or slope of an excavation, substantially as and for the purposes described.

25. In a conveyer apparatus for making artificial excavations, the combination of a truss carried by trucks at its ends to span an excavation and having a cantaliver-arm as an integral part thereof, a track having its horizontal part suspended from the truss and its inclined part fastened to the cantaliver-arm, an endless conveyer supported on said track and following the lines of its horizontal and inclined lengths, and guards carried by the track along the lines where its horizontal and inclined lengths join each other, said guards arranged in operative relation to the conveyer to overcome any tendency thereof to be lifted from the track, as and for the purposes described.

In testimony whereof I affix my signature in presence of two witnesses.

ARTHUR JOHN MASON.

Witnesses:
    F. M. LOWE,
    F. S. CASEY.